United States Patent
Germanenko et al.

(10) Patent No.: US 7,088,456 B2
(45) Date of Patent: Aug. 8, 2006

(54) THIN FILM THICKNESS MEASUREMENT USING MULTICHANNEL INFRARED SENSOR

(75) Inventors: Igor N. Germanenko, Cupertino, CA (US); Steve Axelrod, Los Altos, CA (US)

(73) Assignee: Honeywell International Inc., Morristown, NJ (US)

( * ) Notice: Subject to any disclaimer, the term of this patent is extended or adjusted under 35 U.S.C. 154(b) by 124 days.

(21) Appl. No.: 10/831,074

(22) Filed: Apr. 24, 2004

(65) Prior Publication Data

US 2005/0237539 A1    Oct. 27, 2005

(51) Int. Cl.
*G01B 11/02* (2006.01)
(52) U.S. Cl. .............. 356/504; 356/637; 356/630; 356/419; 250/559.28
(58) Field of Classification Search ............. 356/504, 356/503, 485, 637, 630, 486, 492, 496, 419; 250/559.27, 559.28

See application file for complete search history.

(56) References Cited

U.S. PATENT DOCUMENTS

| | | |
|---|---|---|
| 6,281,678 B1 | 8/2001 | King et al. |
| 6,459,488 B1 | 10/2002 | Heffner |
| 6,515,746 B1 | 2/2003 | Opsal et al. |
| 6,556,306 B1 | 4/2003 | Jiang et al. |
| 6,573,999 B1 | 6/2003 | Yang |
| 6,646,752 B1 | 11/2003 | Chen et al. |

*Primary Examiner*—Gregory J. Toatley, Jr.
*Assistant Examiner*—Denise B. Anderson
(74) *Attorney, Agent, or Firm*—Charles H. Jew

(57) ABSTRACT

A system and method for analyzing the characteristics of a thin film is provided. The current invention extends the capability of IR sensors to measure thin films through configuring a plurality of detection channels with appropriately chosen filters. With the multichannel infrared sensor, the characteristic signature of interference fringes can be detected simultaneously with, or instead, of absorption-based measurements.

25 Claims, 6 Drawing Sheets

THIN FILM THICKNESS MEASUREMENT USING MULTICHANNEL INFRARED SENSOR

FIELD OF THE INVENTION

The invention relates to apparatuses and methods for the measurement of thin films properties, such as the thickness and basis weight.

BACKGROUND

Thin films are layers of material(s) deposited on a surface of another material, such as paper. Thin films are an essential component in many products. Common examples include thin film coatings of silicone on paper for use as a release coating for adhesive labels and silicone films that line diapers and other hygiene products to repel moisture as a method of keeping skin dry. Films used in these products typically range from less than a nanometer (10 Å) to several hundred micrometers in thickness. They can be formed by many different processes, including spin coating, vacuum evaporation, sputtering, vapor deposition, and dip coating. To perform their desired functions, thin films must have the appropriate thickness, composition, and other important characteristics. These properties must be precisely monitored both during and after fabrication.

The thickness of thin films is typically measured by stylus based or optical techniques. Stylus techniques measure thickness by monitoring the deflections of a fine-tipped stylus as it is dragged along the surface of the film. Stylus instruments, which may actually damage the films being measured, are limited in speed and accuracy. Optical techniques, which measure film thickness by measuring film interaction with light, are nondestructive and more accurate. Optical techniques are also usually preferred because they require little or no sample preparation.

One optical technique works by measuring the relative amount of light absorbed by a sample in two or more wavelength bands of the infrared (IR) spectrum. In the simplest case, two bands are used, a measure band and a reference band. The measure band is selected to coincide with a strong absorption in the target material (film to be measured), and the reference band is selected to match a weakly absorbing region of the target material. In more complicated cases, the measure band for one target may be the reference band for another target.

The transmission measurement is based on Beer's Law, which states $I=I_0 e^{-\mu w}$, where $I_0$ is the signal with no sample, I is the signal with sample, $\mu$ is the absorption coefficient, and w is the weight of the sample. Equivalently, this may be written as $w=(1/\mu) \ln(I_0/I)$. Thus for a given wavelength of IR radiation, the weight, or thickness of the film, is proportional to the logarithm of the attenuation.

In practice the accuracy of such transmission techniques is limited when measuring in the thin film regime due to an interference fringing effect. Fringes in the transmission spectrum of the measured film appear due to interference of the light reflected from the film surfaces with light transmitted through the film. An example is illustrated in FIG. 1, which shows interference fringes 31 forming when the transmission of a 16 μm polyamide film is measured at different wavelengths. As a result the sensor calibration error for such films increases significantly making measurements inaccurate. The lower limit is about 15–30 microns for IR radiation, and depends on the material of the film.

To understand the fringing effect, consider a thin film with thickness d and index of refraction n, deposited on another material as shown in FIG. 2. Both the top and bottom of the film will reflect a portion of the incident light. The total amount of reflected light is the sum of these two reflections. Because of the wavelike nature of light, the reflections from the two interfaces may add together constructively or destructively, depending on their phase relationship. Their phase relationship is determined by the difference in the optical path lengths of the two reflections, which in turn is determined by the thickness of the film, d. Reflections are in-phase and therefore add constructively when the light path is equal to one integral multiple of the wavelength of light. For light perpendicularly incident on a film, this occurs when $2nd=i\lambda$, where d is the thickness of the film, i is an integer, and $\lambda$ is the free space wavelength of the incident radiation. (The factor of two accounts for the fact that the light passes through two interfaces.) Conversely, reflections are out of phase and add destructively when the light path is half of a wavelength different from the in-phase condition, or when $2nd=(i+\frac{1}{2})\lambda$.

The qualitative aspects of these reflections may be combined in a single equation:

$$R = A + B \cos(2\pi nd/\lambda).$$

From this we see that the reflectance will vary periodically with wave number $1/\lambda$. Furthermore, at a given wavelength (index of refraction n is wavelength dependent) the frequency of oscillations is proportional to film thickness d. The light that is not reflected, that is, the transmitted light, can be detected by sensors located on the opposite side of the film. It will have a similar periodic component superposed on a non-oscillatory signal.

Because the spectral position and intensity of the fringes depend on the film thickness, it is possible to extend current transmission sensors into the thin film regime by measuring the shape of the fringes and extracting the film thickness from the fringe parameters.

SUMMARY OF THE INVENTION

The present invention is based in part on the development of a novel technique for extending the capabilities of transmission sensors for measuring thin films, by measuring the shape of the interference fringes in the transmission spectra.

In one aspect, the invention is directed to a method of measuring film thickness that includes the steps of:
emitting a probe beam of radiation,
transmitting said probe beam through a film to be measured,
separating the beam transmitted through the film into a plurality of parallel beams with beamsplitters,
passing each parallel beam through an individual filter designed to pass a predetermined waveband,
detecting and recording the energy transmitted in each predetermined waveband with a photoconductive detector,
utilizing the data for energy transmitted at said predetermined wavebands in a curve fitting algorithm to recover the full curve of spectral fringe, and
utilizing a fringe counting method to calculate the characteristics of the film.

In another aspect, the invention is directed to a system for measuring film thickness that includes:
means for emitting a probe beam of radiation through a film to be measured, means for separating the beam transmitted through the film into a plurality of parallel beams, a plurality of filters, each of said filters allowing a parallel beam to pass at a different predetermined waveband, photoconductive detector means for detecting and recording the energy transmitted in each predetermined waveband, electronic means to utilize the data for energy transmitted at said predetermined wavebands in a curve fitting algorithm to recover the full curve of spectral fringe, and to utilize a fringe counting method to calculate the characteristics of the film.

DETAILED DESCRIPTION OF THE PREFERRED EMBODIMENTS

In accordance with the invention, a novel infrared (IR) film thickness measurement system is provided. Specifically, the invention provides a novel method of extending the capability of IR sensors to measure thin films through configuring multiple detection channels with appropriately chosen filters. With the invention, the characteristic signature of interference fringes can be detected simultaneously with or instead of absorption-based measurements.

The system comprises three main sections: (i) a source of modulated IR energy, (ii) a sample cell in which the IR energy interacts with the sample to be measured, and (iii) a receiver/analyzer in which the transmitted energy on all of the selected channels is simultaneously read.

Figure 1:
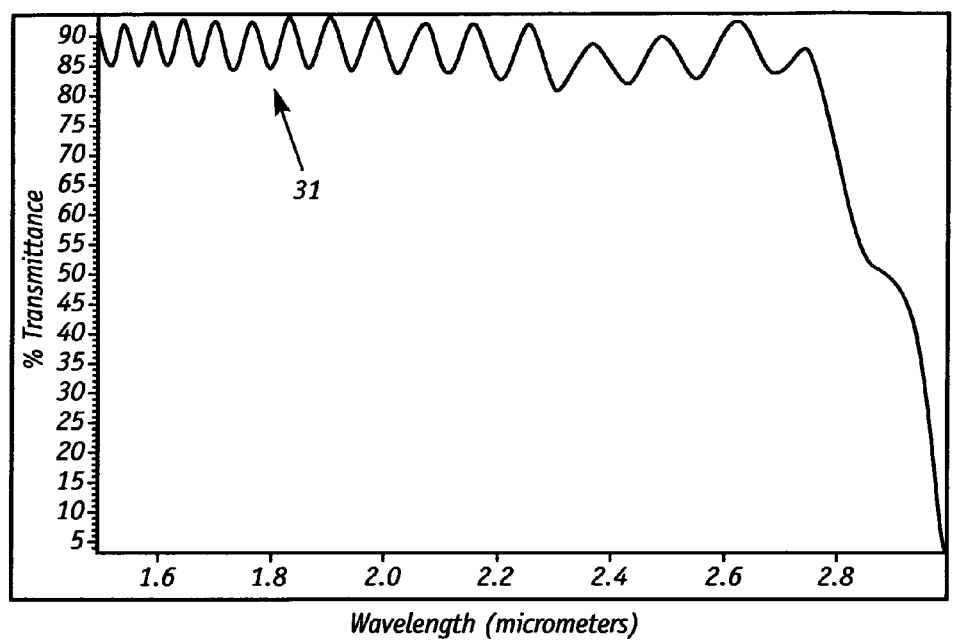
FIG. 1 is a graph of measured percentage transmission vs. wavelength for a 16 μm thick polyamide film which shows interference fringes.
Figure 2:
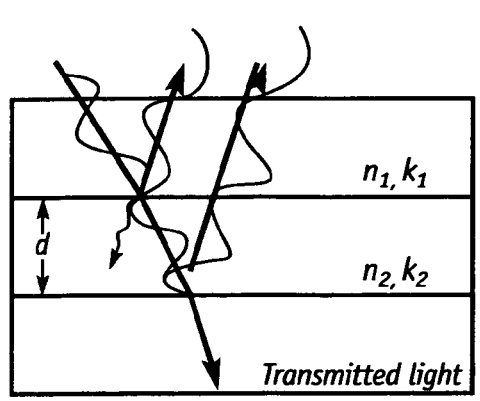
FIG. 2 shows a basic concept diagram of a light wave passing through a thin film with thickness d.
Figure 3:
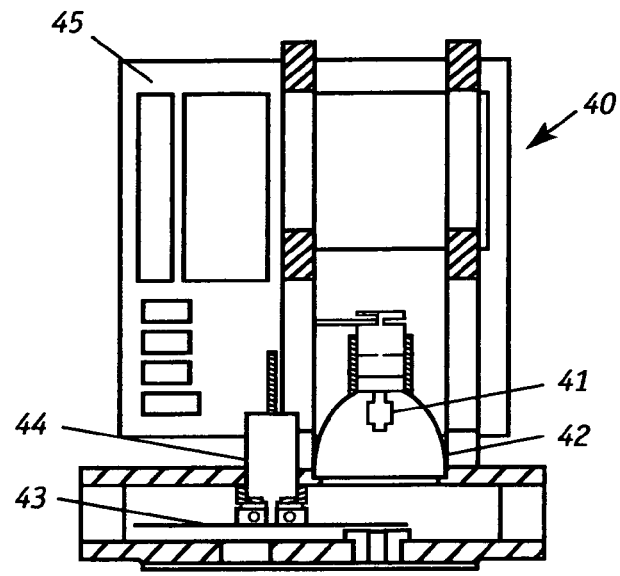
FIG. 3 shows a source assembly of the infrared film thickness measurement system according to the invention.

FIG. 3 illustrates an IR source assembly 40. An IR source transmits pulses of wideband IR to the sample between the upper and lower heads. It consists of an incandescent light 41, a mirror 42, and supporting hardware for modulating the IR energy. A quartz tungsten halogen lamp is used because of its compact size, and the quartz envelope is transparent to the IR energy in the wavebands of interest in the application. The small filament of the lamp makes it possible to focus most of the energy onto the window. Radiation from the quartz tungsten halogen lamp is focused at a light pipe by the mirror 42. The only adjustment required is the focusing of the lamp by sliding it in the holder to maximize the signal strength at the receiver.

The IR energy is modulated with chopper 43, a lightweight rotating stainless steel disc with preferably eight evenly spaced holes. It is driven by a brushless DC motor 44 that modulates the radiation at 620±25 Hz. Modulating the IR energy will prevent the signal received by the detectors in the receiver from being obscured by ambient light or by low frequency noise generated in the detector.

The sample cell is the located in the space between the IR source and receiver windows. The sample film to be measured is placed here to interact with the IR energy. It is very important that the IR energy transmitted be determined only by the properties of the sample and not by extraneous effects, such as dirt and head misalignment or separation.

Figure 4:
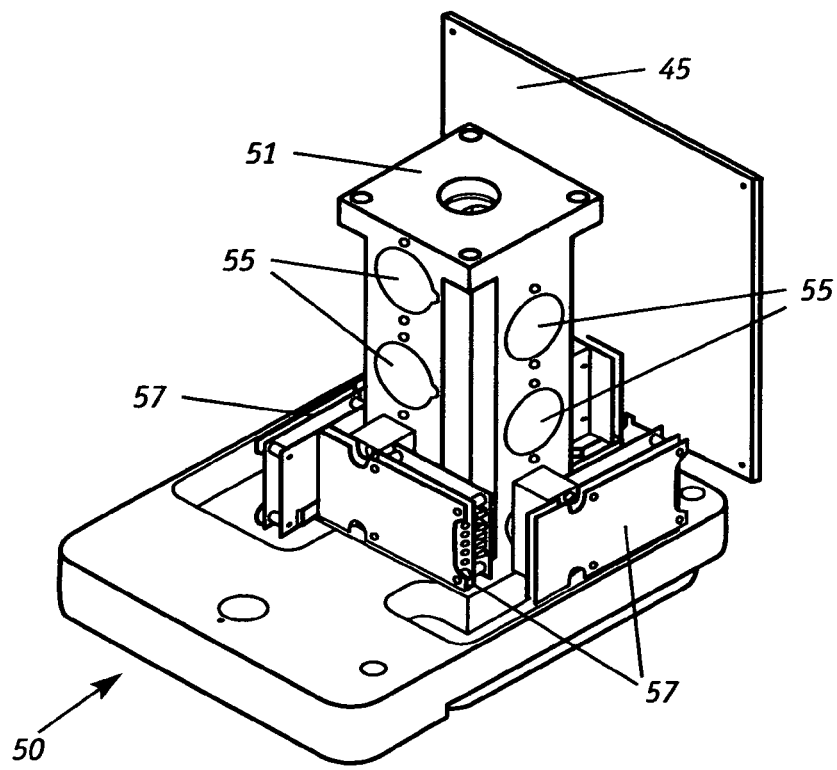
FIG. 4 shows a receiver assembly according to the invention.

The receiver assembly 50 is shown in FIG. 4. The function of the receiver is to simultaneously read the transmitted energy in all of the selected bands. This is done by using beamsplitters (66 in FIG. 5) to separate the energy into a series of parallel beams. Each beam is then passed through a filter designed to pass a predetermined waveband, and the total energy in that band is detected by a photoconductive detector. The detectors can be chosen from lead sulfide (PbS), lead selenide (PbSe) or silicon (Si) types. Each detector has its own conventional electronics 57 that amplify the received signal, convert it to DC, and transmit it to the receiver.

The receiver assembly 50 has capacity to support up to preferably twelve channels, and can load additional channels as needed. A central aluminum 51 column has sockets 55 that can support up to twelve channels. The central column 51 is mounted to a water-cooled plate in the ceiling (not shown) for cooling the sensors.

Figure 5:
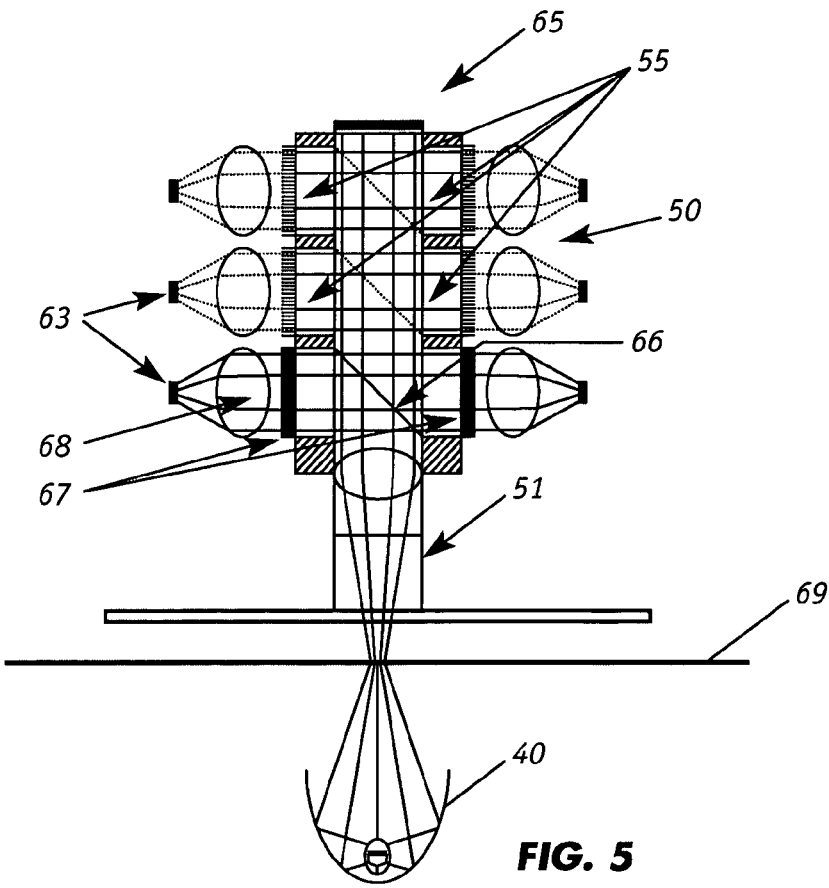
FIG. 5 shows channels mounted to the center column of the receiver assembly.

FIG. 5 shows channels mounted to the center column 65. In the diagram, only 6 channels are shown mounted for clarity. Additional channels can be mounted to the central column 51 at sockets 55 as required. Each channel comprises a detector 63 an IR band selection filter 67, lens 68 and support electronics. In accordance with an embodiment of the invention, up to preferably twelve channels are utilized at once. Heat from the electronics and peltier cooling of detectors is conducted from the detector assemblies through the column 55 to the water-cooled plate.

A thin film sample 69 is loaded and secured in the sample cell, and the IR source 40 operated to transmit pulses of wideband IR through the sample. The receiver reads the transmitted energy in all of the selected bands simultaneously, and the output of each of the detectors is transmitted to the signal processing circuitry 45 (FIG. 3, 4) to process the signal. The wavelength and transmittance percentage can then be electronically plotted on a graph.

Figure 6:
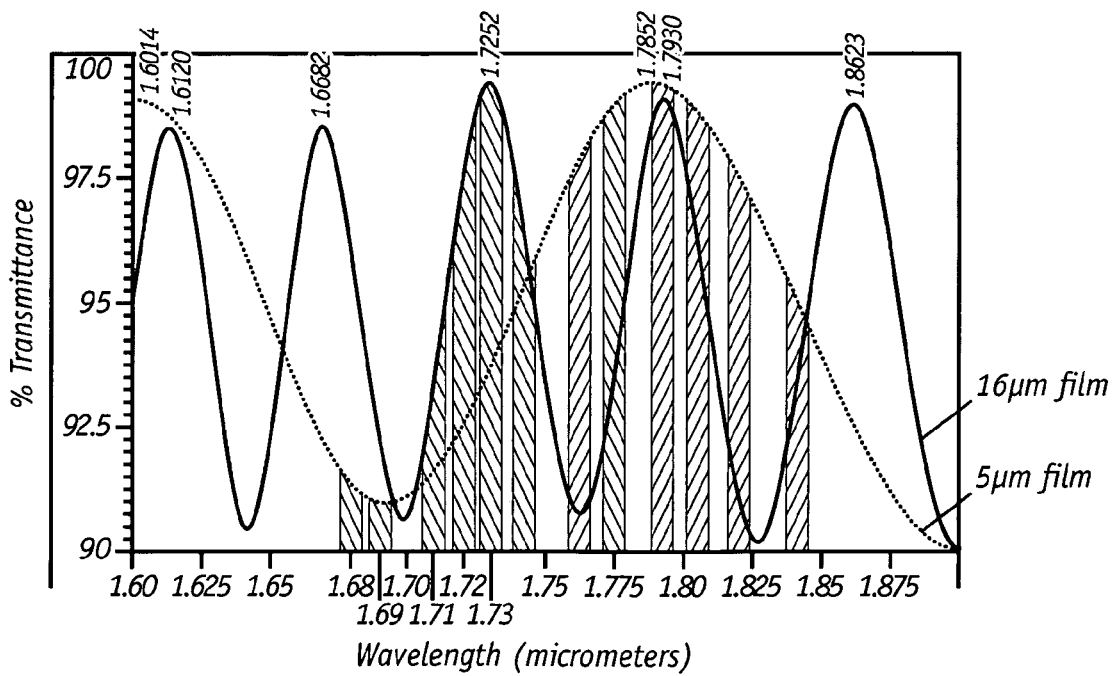
FIG. 6 shows the interference fringes formed from measuring 5 μm and 16 μm NYLON films.

FIG. 6 shows the interference fringes formed from measuring 5 and 16 μm NYLON films with a Fourier Transform Infrared (FTIR) spectrometer. In order to detect the characteristic signature of interference fringes, appropriately chosen optical filters are utilized. The dashed areas under the fringes represents proposed filter wavelengths for a twelve channel IR sensor according to an embodiment of the invention.

In an embodiment of the invention, narrow bandpass optical filters will be used. These filters are typically interference filters that have a spectral transmission band surrounded by two blocking bands that allow only a portion of the spectrum to pass. This results in high transmission centered around the chosen wavelength. Optical filters available from Spectrogon US Inc., Parsippany, N.J. are suitable.

Several conditions need to be taken into account before the appropriate filters could be selected. These conditions are dictated by the limited number of available channels and the limited choice of commercially-available filters.

First, the channels of the IR sensor need to be calibrated for the spectral region where the chosen photoconductive detectors are sensitive to the incident light. By switching the type of photo-sensitive element (PbS, PbSe or Si) for the photoconductive detectors, it is possible to detect spectrum in the mid IR (using PbSe) or visible (using Si) range. Using PbS and Si detectors, the total working spectral range of the IRPlus sensor is from 400 nm to 5000 nm. However, many plastic films exhibit strong surface scattering and strong fundamental absorption lines for this spectral range, and it becomes difficult to accurately examine the interference fringes. For these reasons, PbS detector cells are preferred. PbS dedector cells have a spectral sensitivity range from 1000 nm to 3000 nm. For the spectral region between 1600 nm and 1800 nm, most plastic films do not exhibit absorption lines, or only exhibit weak ones. This is important for the generation of measurable interference fringes.

Second, the filters for each channel should transmit as narrow band as possible in order to attribute the signal from the IR detector to a single wavelength. This wavelength will be used in the sine wave recovery algorithm discussed below.

The third requirement arises from the fact that at least half a period (P) is required in order to recover the shape of the interference fringe. The thinner the film, the wider the period of the spectral fringes. (Refer to FIG. 6 for a comparison of the spectral fringes of the 5 μm and 16 μm films.) This dictates that the transmission band central wavelengths (CWL) of the chosen filters be positioned at sufficiently large spectral distance from each other, in order to cover the spectral range for thinner films.

Conversely, thicker films require at least three measurement points for each half period of a fringe in order to find an unique solution in the fitting algorithm. To extend the measurement range of the sensor to thicker films, where fringes have higher frequency of spectral oscillations, it is advantageous to choose filters with CWLs as close to each other as possible, without spectral overlapping. This necessitates a trade off during filter selection in order to cover both thin and thick films.

According to an embodiment of the invention, the twelve filters chosen have CWLs that range from 1620 nm to 1840 nm. The filters' characteristics are shown in Table 1. The halfwidth (HW) of the filters' transmission bands are shown on FIG. 6 as the shaded areas.

The following table lists chosen filters from Spectrogon Inc.

TABLE I

| | Filter p/n | CWL, nm | HW, nm |
|---|---|---|---|
| 1. | NB-1560-009-B | 1560 | 9 |
| 2. | NB-1620-010-B | 1620 | 10 |
| 3. | NB-1630-010-B | 1630 | 10 |
| 4. | NB-1640-010-B | 1640 | 10 |
| 5. | NB-1650-010-B | 1650 | 10 |
| 6. | NB-1680-010-B | 1680 | 10 |
| 7. | NB-1690-010-B | 1690 | 10 |
| 8. | NB-1710-010-B | 1710 | 10 |
| 9. | NB-1720-010-B | 1720 | 10 |
| 10. | NB-1730-010-B | 1730 | 10 |
| 11. | NB-1740-010-B | 1740 | 10 |
| 12. | NB-1765-010-B | 1765 | 10 |

TABLE I-continued

| | Filter p/n | CWL, nm | HW, nm |
|---|---|---|---|
| 13. | NB-1775-010-B | 1775 | 10 |
| 14. | NB-1790-010-B | 1790 | 10 |
| 15. | NB-1805-010-B | 1805 | 10 |
| 16. | NB-1820-010-B | 1820 | 10 |
| 17. | NB-1840-010-B | 1840 | 10 |
| 18. | NB-1875-010-B | 1875 | 10 |
| 19. | NB-1905-010-B | 1905 | 10 |
| 20. | NB-1930-010-B | 1930 | 10 |
| 21. | NB-1940-010-B | 1940 | 10 |

Figure 7:
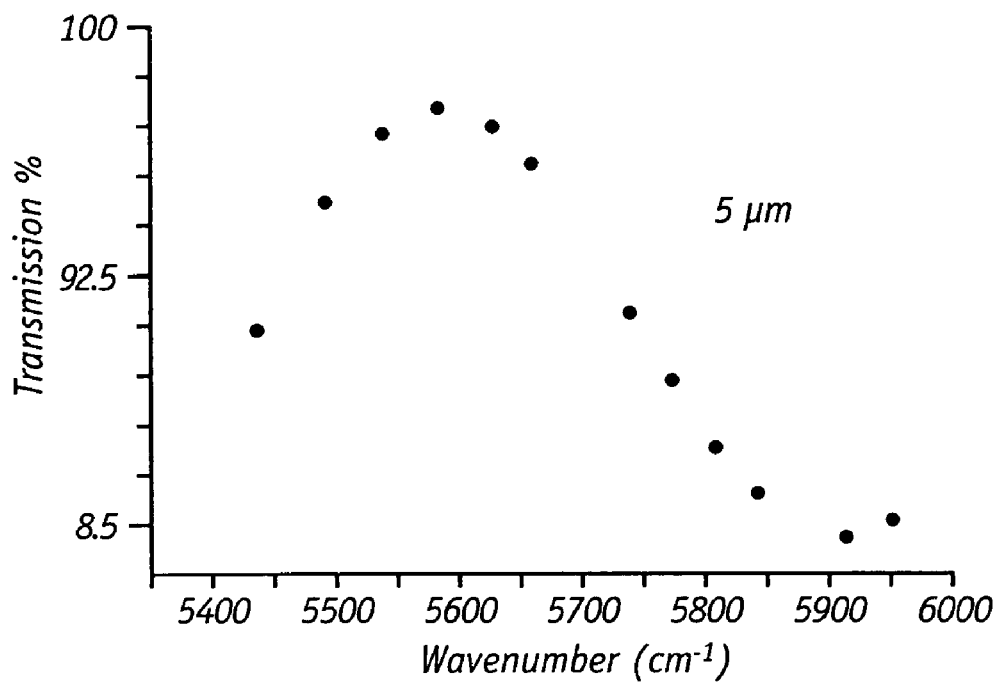
FIG. 7 depicts a graph plotting the data obtained from measuring a 5 μm NYLON film.
Figure 8:
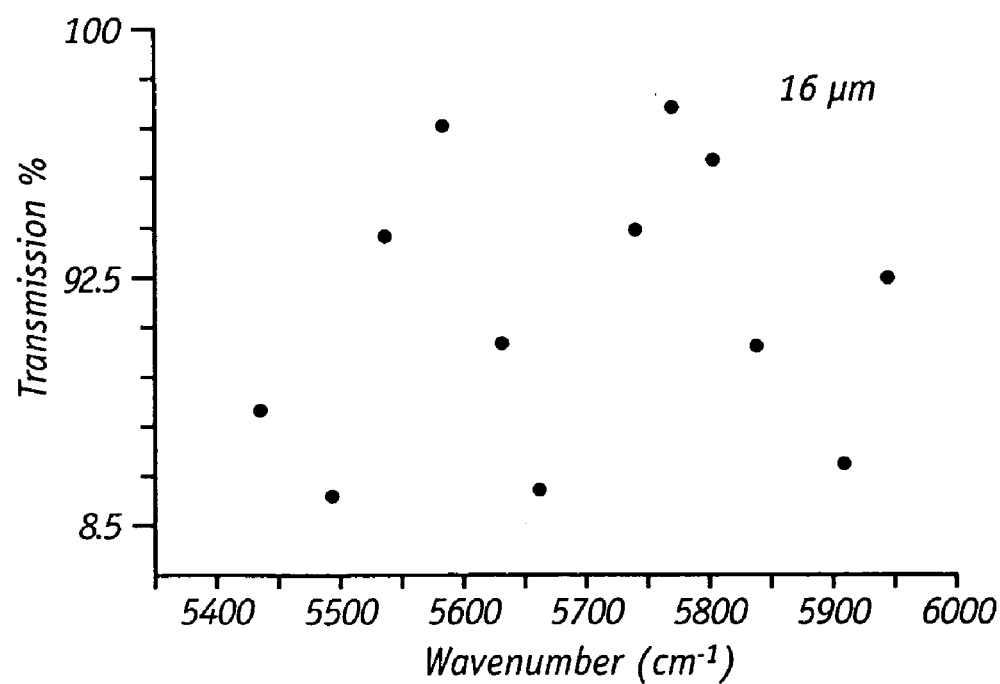
FIG. 8 depicts a graph plotting the data obtained from measuring a 16 μm NYLON film.

Utilizing the FTIR measurement of FIG. 6, the transmittance at the passbands of the twelve proposed filters can be ascertained. These sets of twelve values for the 5 μm and 16 μm NYLON fits can be used as simulated experimental data. These simulated IR transmission data are plotted in FIGS. 7 and 8.

Next, a fitting algorithm, such as the Levenberg-Marquardt nonlinear fitting algorithm, is applied to fit the measured data to a sine curve.

The calculations are as follows:

$$V_d(x) = b + A \sin(2\pi f(x-c))$$

where:

$V_d$—IR detector output, which is a measure of the IR transmission % x—wave number (cm$^{-1}$)=10000000/wavelength (nm)

b, c—scale offset fitting parameters

A—fringe amplitude f—frequency of fringe oscillations in wave number space

The goal of the fitting algorithm is to find parameter f, which is unique for a given thickness of the measured film.

Fit results are presented in the following table.

| Film thickness, μm | 5 | 16 |
|---|---|---|
| Chi^2 | 1.8E−6 | 30.0E−6 |
| A | 0.02137 | 0.02102 |
| f | 0.00158 | 0.00476 |
| b | 0.06023 | 0.05099 |
| c | 5436.0 | 5525.8 |

Figure 9:
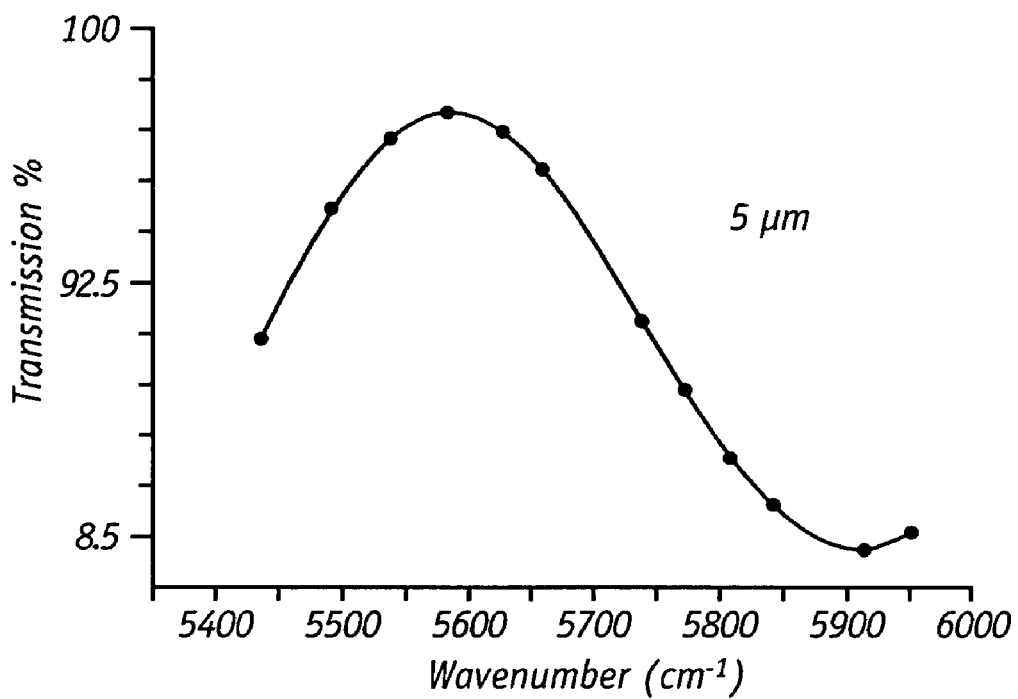
FIG. 9 shows the result of curve fitting calculations for the data depicted in FIG. 8.
Figure 10:
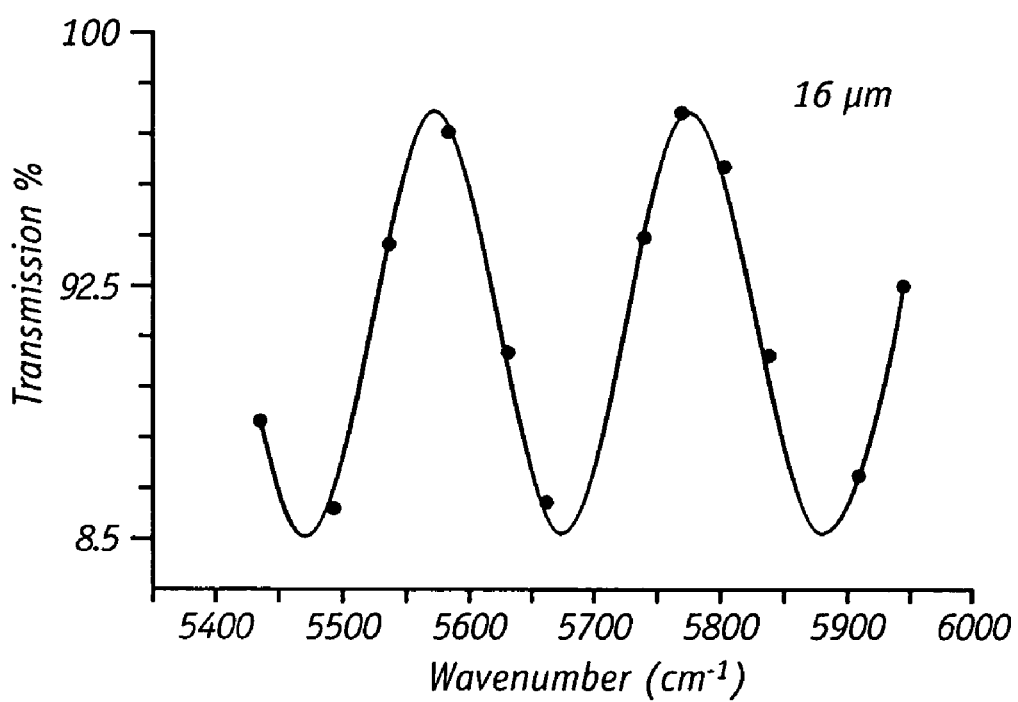
FIG. 10 shows the result of curve fitting calculations for the data depicted in FIG. 9.

Chi^2 represents goodness of the fit. Parameters obtained from the fit can be compared if the parameters of the fringes measured using FTIR spectrometer. The simulations confirm the first possibility of using pre fitting procedure to completely recover the full shape of the spectral fringes using the signal amplitude at just twelve spectral positions. FIGS. 9 and 10 show the results of the fitting routine calculations.

The above fitting algorithm yields f the frequency of fringe oscillations in wave number space. From the recovered spectral fringing curve, the film thickness d can be extracted by examining the spectral position of the first and last recovered interference fringe, using the formula:

$$2\pi d \left( \frac{n_1}{\lambda_1} - \frac{n_2}{\lambda_2} \right) = N\pi,$$

or:

-continued $$d = \frac{N\lambda_1\lambda_2}{2(n_1\lambda_2 - n_2\lambda_1)}$$

Where:
$\lambda_1$—spectral position of the first recovered interference fringe
$\lambda_2$—spectral position of the last recovered interference fringe
$n_1$—refractive index of the film at wavelength $\lambda_1$
$n_2$—refractive index of the film at wavelength $\lambda_2$
N—number of spectral fringes between $\lambda_1$ and $\lambda_2$ Using this fringe counting method, the index of refraction is only needed at the two wavelengths $\lambda_1$ and $\lambda_2$.

An IR sensor commercially available by Honeywell International Inc. (Morristown, N.J.) under the name IR-Plus Infrared Transmission Sensor can be modified for use in the IR film thickness measurement system describe above. In accordance with one embodiment of the invention, the IR-Plus sensor can be adapted to use up to twelve receiver channels at once. The twelve channels may require calibration before taking measurements, depending on whether the refraction index of the measured film is known. During this procedure a number of film samples should be measured in order to determine the correct refraction index to be used in the formula above.

In another embodiment of the invention, the multichannel sensor can be employed to measure film characteristics in a traditional absoprtive mode to obtain preliminary approximate values before proceeding with employing the technique described above of measuring the shape of the interference fringes in the transmission spectra. For example, fewer than twelve channels, e.g., two channels, of the multichannel infrared sensor can be dedicated to absorptive measurements and the remaining channels can be employed for interference measurements.

Figure 11:
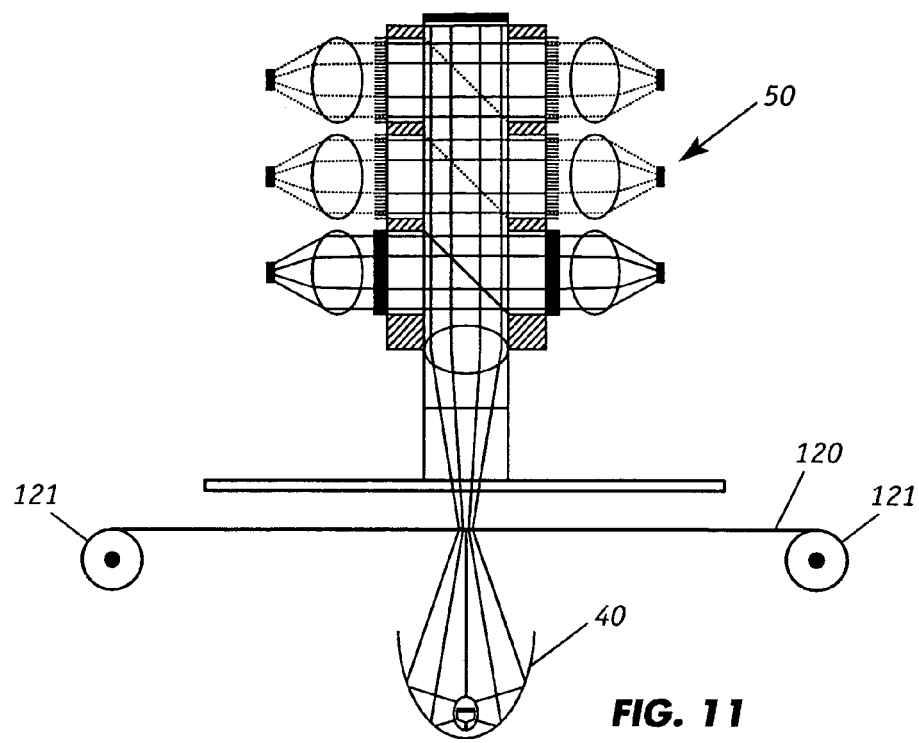
FIG. 11 shows a schematic drawing of the system adapted to measure moving webs.
Figure 12:
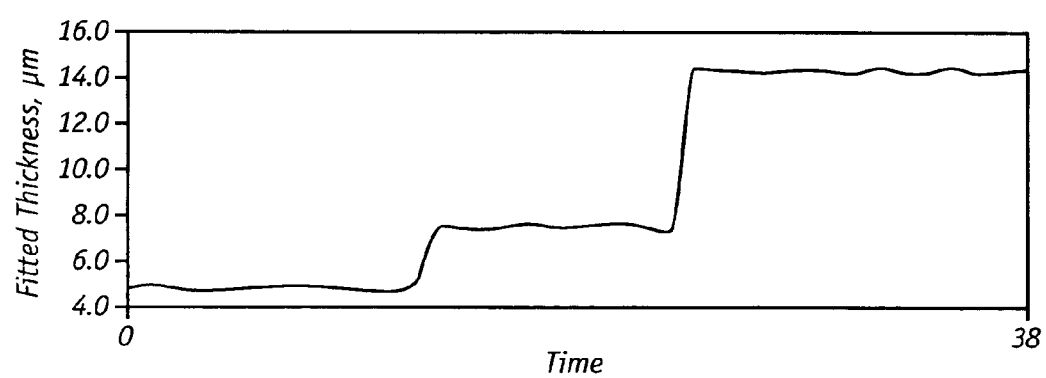
FIG. 12 shows an exemplary graph plotting changes in measured thickness over time in a moving web.

In a further embodiment of the invention, the thin thickness measurement system described above can be adapted for use in paper or other flat-sheet production processes. The IR sensor can be adapted to scan across a moving web to detect defects and to measure basis weight and thickness parameters. FIG. 11 shows a schematic diagram of such a system, with the web 120 to be measured placed on a conveyer 121 which moves the web past the IR source 40 and the receiver assembly 50. Alternatively, the IR source and receiver assembly can be made to be movable in synchronization with each other. Changes in the measured thickness can be depicted in a graph that plots measured thickness versus time.

In paper production, thickness is a difficult property to measure because the distribution of mass in paper and cardboard is uneven. As a result the paper surface has small nooks and crannies at scales varying from a few μm up to a few cm. The "thickness" of newsprint may vary by 30% over a short distance at the microscopic scale. An accurate measurement of thickness is needed to calculate the density and basis weight of the paper, which is important because of their effect on strength and optical properties. Basis weight, also called grammage and ream weight, describes the weight in pounds of a ream (500 sheets) of paper that has been cut to a given standard size for that grade of paper. In countries using ISO paper sizes, the basis weight is given in grams of one square meter of paper.

To overcome the difficulties in measuring and recording the thickness of a single web of paper, the effective thickness can be measured instead. Using the methods described above, the thickness profiles of the web is taken at two chosen spots along the web. The effective thickness is the mean of the difference between the two measured values. The basis weight can then be calculated from the known weight of the sample ream and the measured effective thickness of the paper.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method of analyzing the characteristics of a film comprising the steps of:
   (a) emitting a probe beam of radiation,
   (b) transmitting said probe beam through a film to be measured,
   (c) separating the beam transmitted through the film into a plurality of parallel beams with beamsplitters,
   (d) passing each parallel beam through an individual filter designed to pass a predetermined waveband,
   (e) detecting and recording the energy transmitted in each predetermined waveband with a photoconductive detector,
   (f) utilizing the data for energy transmitted at the predetermined wavebands in a curve fitting algorithm to recover the full curve of spectral fringe, and
   (g) utilizing a fringe counting method to calculate at least one characteristic of the film.

2. The method of claim 1 wherein the filters are bandpass filters.

3. The method of claim 1 wherein the filters are narrow bandpass filters.

4. The method of claim 1 wherein the transmitted energy in all of the selected wavebands are simultaneously read.

5. The method of claim 1 wherein at least two filters of different wavebands are used.

6. The method of claim 5 wherein said at least two filters used have transmission band central wavelengths that range from 1620 nm to 1840 nm.

7. The method of claim 1 wherein the photoconductive detector has an element selected from the group consisting of PbS, PbSe and Si.

8. The method of claim 1 wherein the working spectral range of the photoconductive detector is from 400 nm to 5000 nm.

9. The method of claim 1 wherein the characteristic measured is a thickness of the film.

10. The method of claim 1 wherein the characteristic measured is a thickness profile of the film.

11. The method of claim 1 wherein the characteristic measured is a basis weight of the film.

12. The method of claim 1 further comprising measuring an approximate value of the characteristic of the film prior to step (a).

13. A system for analyzing the characteristics of a film comprising:

means for emitting a probe beam of radiation through a film to be measured, means for separating the beam transmitted through the film into a plurality of parallel beams, a plurality of filters, each of said filters allowing a parallel beam to pass at a different predetermined waveband, photoconductive detector means for detecting and recording the energy transmitted in each predetermined waveband, electronic means to utilize the data for energy transmitted at the predetermined wavebands in a curve fitting algorithm to recover the full curve of spectral fringe, and to utilize a fringe counting method to calculate the characteristics of the film.

14. The system of claim 13 wherein the filters are bandpass filters.

15. The system of claim 13 wherein the filters are narrow bandpass filters.

16. The system of claim 13 wherein the transmitted energy in all of the selected wavebands are simultaneously read.

17. The system of claim 13 wherein at least two filters of different wavebands are used.

18. The system of claim 17 wherein said at least two filters used have transmission band central wavelengths that range from 1620 nm to 1840 nm.

19. The system of claim 13 wherein the photoconductive detector has an element selected from the group consisting of PbS, PbSe and Si.

20. The system of claim 13 wherein the working spectral range of the photoconductive detector is from 400 nm to 5000 nm.

21. The system of claim 13 wherein the characteristic measured a thickness of the film.

22. The system of claim 13 wherein the characteristic measured is a thickness profile of the film.

23. The system of claim 13 wherein the characteristic measured is a basis weight of the film.

24. The system of claim 13 wherein the film measured is a continuously moving web.

25. The method of claim 1 wherein the film analyzed is a continuously moving web.

* * * * *